Patented May 17, 1949

2,470,203

UNITED STATES PATENT OFFICE 2,470,203

FILTER

Leonard Wickenden, Westport, Conn.

No Drawing. Application May 8, 1947,
Serial No. 746,869

5 Claims. (Cl. 127—49)

This invention relates to the refining of solutions containing coloring and other organic impurities, more particularly sugar syrups or melts (hereinafter called "sugar syrups" or "syrup"), and has for its object certain improvements in filters used in the treatment of such solutions to remove therefrom objectionable impurities.

My invention provides an improved filter for purifying sugar syrups for the removal of coloring and suspended matter. The invention is especially advantageous in operations in which an adsorbing material is used, such as activated carbon, bone char or diatomaceous earth, because of the effective removal of impurities that would otherwise foul such adsorbing materials.

My invention involves the use of phosphoric acid and a compound of an alkaline earth metal of the group consisting of calcium and magnesium, especially lime and magnesia. More particularly, my invention involves the conjoint use of the phosphoric acid and one or more of such alkaline earth compounds under conditions which result in the precipitation of an insoluble phosphate of the alkaline earth metal in the sugar syrup undergoing purification, for the purpose of trapping, coagulating, or otherwise absorbing suspended matter contained in the syrup. As an alkaline earth compound I have found milk of lime to be especially advantageous. I have found it important to use as an alkaline earth compound activated magnesia which has the property of adsorbing coloring matter and other impurities from the syrup. In using such magnesia, I accomplish both an adsorption of impurities and a reaction with the phosphoric acid forming an insoluble phosphate which collects suspended matter. The phosphoric acid ($H_3PO_4$) may be provided in any suitable form, such as the acid itself or acid calcium phosphate.

In accordance with my invention, I suspend a mixture of the alkaline earth compound and phosphoric acid in a granular supporting structure, advantageously a filter of screened hard, non-soluble material, and flow the syrup through the filter to effect a removal of impurities. In an especially effective filter of my invention, I use small particles of screened petroleum coke, preferably a screened product having the screen analysis hereinafter described.

In a very practical embodiment of my invention, I divide the screened coke into two parts of about equal volume. One-half is impregnated with milk of lime, magnesia, or the like, and the other half is impregnated with the phosphoric acid. The two halves are then mixed together and introduced into the circuit through which the syrup flows, or the mixture may be used in batch treatments. In one system of continuous filtering, I so locate a filter bed of the said mixture in the circuit that the impure syrup first encounters the mixture before passing through other filters such as bone char, or filters employing activated carbon, such as the filter described in my United States Patent 2,372,996. When the syrup is run through the bed of this invention, it encounters particles of coke impregnated with lime and then particles of coke impregnated with phosphoric acid so that there is a rapid succession of minute defecations taking place, in which the impurities in the sugar syrup are entrained in the precipitated calcium phosphate formed by this repeated reaction. After leaving a considerable portion of its impurities in this filter bed, the syrup is passed on through other filters which are used more efficiently without fouling by reason of the relative purity of the syrup passing through them.

In those operations heretofore practiced in which lime and phosphoric acid have been used, the precipitate produced is very slimy in character and, therefore, very difficult to sweeten off. It is such a tiresome and laborious procedure to filter this slimy mud to recover the sugar that a very large percentage of the refineries have abandoned the lime and phosphoric acid treatment. In my improved filter, the particles of coke maintain a sufficient porosity that a slime does not form. The sugar can be recovered in sweetening off merely by running fresh water through the filter bed. After the sugar has been removed, the coke is washed with a dilute solution of hydrochloric acid to remove the impurities comprising organic precipitated matter and calcium phosphate. The coke may be reused in forming another filter bed.

The following example illustrates one practical method of forming a filter of my invention. The ground petroleum coke is screened to have the following screen analysis:

Through 10 on 20—33⅓%
Through 20 on 40—33⅓%
Through 40 on 60—33⅓%

The coke may be fresh or reactivated with hydrochloric acid as described above.

150 grams of the screened coke are mixed with milk of lime equivalent to 1 gram of $CaO(OH)_2$. 150 grams of the screened coke are mixed with 0.75 gram of phosphoric acid. The two portions of cokes are then intimately mixed together to form a filter of my invention. This amount of filter will handle a sugar syrup equivalent to 1100 grams of washed sugar solids.

In using a filter comprising activated magnesia, I use an amount of magnesia equal to around 0.5% on washed sugar and as much as 5% on affinations based on the weight of the coke. Suitable forms of activated magnesia are described in Industrial and Engineering Chemistry, vol. 32, p. 132, and vol. 39, pp. 69 to 74.

I claim:

1. An improved filter for the purification of solutions containing coloring and other organic impurities which comprises an admixture of particles of granular petroleum coke, some particles of which are coated with phosphoric acid and other particles of which are coated with a compound of a metal of the group consisting of calcium and magnesium which will react with the phosphoric acid to form an insoluble phosphate.

2. A filter according to claim 1 which comprises particles of petroleum coke that will pass through a 20-mesh screen and be retained on a 100-mesh screen.

3. An improved filter for the purification of solutions containing coloring and other organic impurities which comprises one body of solid granular carrier particles coated with phosphoric acid and another body of such granular particles coated with a compound of a metal of the group consisting of calcium and magnesium which will react with the phosphoric acid to form an insoluble phosphate, said bodies of particles being in operative association in the filter.

4. A filter according to claim 3 which comprises an alkali metal compound in the form of calcium hydrate.

5. A filter according to claim 3 which comprises an alkali metal compound in the form of activated magnesia.

LEONARD WICKENDEN.

REFERENCES CITED

The following references are of record in the file of this patent:

UNITED STATES PATENTS

| Number | Name | Date |
| --- | --- | --- |
| 553,974 | Wiechmann | Feb. 4, 1896 |
| 1,088,751 | Wayte | Mar. 3, 1914 |
| 1,170,868 | Bachler | Feb. 8, 1916 |
| 1,314,203 | Mumford | Aug. 26, 1919 |
| 1,699,449 | Ray | Jan. 15, 1929 |
| 2,216,754 | Sanchez | Oct. 8, 1940 |
| 2,362,357 | Cummings | Nov. 7, 1944 |
| 2,372,996 | Wickenden | Apr. 3, 1945 |